United States Patent [19]

Teigen

[11] Patent Number: 4,623,309

[45] Date of Patent: Nov. 18, 1986

[54] FLUID BED COMBUSTOR AND APPARATUS FOR COOLING PARTICULATE SOLIDS

[75] Inventor: Bard C. Teigen, Enfield, Conn.

[73] Assignee: Combustion Engineering, Inc., Windsor, Conn.

[21] Appl. No.: 799,874

[22] Filed: Nov. 20, 1985

[51] Int. Cl.⁴ .............................................. F23D 19/00
[52] U.S. Cl. ..................................... 431/170; 165/185; 110/245; 432/58
[58] Field of Search ..................... 431/7, 170; 110/245; 122/40, 367 R, 367 A, 367 C; 165/179, 185; 432/58

[56] References Cited

U.S. PATENT DOCUMENTS

| | | | |
|---|---|---|---|
| 2,004,252 | 6/1935 | Sorensen | 165/179 |
| 2,395,757 | 2/1946 | Peters | 122/367 A X |
| 2,872,164 | 2/1959 | Wilson | 165/179 |
| 2,893,705 | 7/1959 | Fennell | 165/179 |
| 3,153,445 | 10/1964 | Huntington | 165/179 X |
| 4,227,488 | 10/1980 | Stewart et al. | 431/170 X |
| 4,330,502 | 5/1982 | Engström | 431/170 X |
| 4,400,150 | 8/1983 | Smith et al. | 431/170 |
| 4,457,289 | 7/1984 | Korenberg | 431/170 X |
| 4,535,706 | 8/1985 | Klaschka | 110/245 |

FOREIGN PATENT DOCUMENTS 2032598  5/1980  United Kingdom ................ 431/170

Primary Examiner—Margaret A. Focarino
Attorney, Agent, or Firm—William W. Habelt

[57] ABSTRACT

A fluidized bed reactor (10) wherein a sulfur-containing particulate fuel is combusted or gasified in a fluidized bed (30) of particulate material, which includes a sulfur oxide absorbent, is provided with a solids cooling apparatus (40) adapted to receive particulate material draining from the bed and cool same via indirect heat transfer to a cooling fluid.

3 Claims, 3 Drawing Figures

FLUID BED COMBUSTOR AND APPARATUS FOR COOLING PARTICULATE SOLIDS

BACKGROUND OF THE INVENTION

The present invention relates to the cooling of hot particulate solids and, more particularly, to the cooling of hot particulate material drained from a fluidized bed prior to transporting that particulate material away from the bed with conventional mechanical conveying equipment.

Fluidized bed combustors have long been recognized as an attractive means of combusting particulate fuel to generate heat. In a typical present day fluid bed furnace, particulate fuel, typically coal having a top size ranging from about 3.0 to about 6.5 mm, is fed to and combusted within a fluidized bed of similar sized particulate material at a temperature in the range of about 760° C. to 925° C. The particulate material comprising the bed usually contains in addition to the particulate fuel, a particulate sulfur absorbent, most commonly limestone, ash material from previously combusted fuel, and sulfated absorbent particles. Fluidizing air, which also serves as combustion air, is supplied to the fluid bed from an air plenum located beneath the bed support plate. The fluidizing air passes upwardly from the air plenum into the fluidized bed through a plurality of holes in the bed support plate at a flow rate sufficiently high to fluidize the particulate material within the fluid bed without entraining a significant portion of that material in the flue gases generated within the bed.

In such fluidized beds, typically referred to as bubbling beds, only a small portion of the particulate material, that particulate material which is relatively fine compared to the majority of particulate material in the bed, is entrained in the flue gases generated within the bed. Such entrained material is removed from the flue gas in a mechanical collector disposed downstream of the furnace prior to venting the flue gas to the atmosphere. As only a small portion of the particulate material is entrained in the flue gas and removed from the bed in such a manner, particulate material tends to accumulate within the bed and must be periodically or continuously drained from the bed. To accomplish this, it is customary to provide drain pipes which extend upwardly through the bed support plate into the bed to receive particulate material therefrom. The particulate material draining from the bed passes through the bed drain pipe to a conveying means disposed beneath the fluidized bed furnace, typically a mechanical screw conveyor or other type of mechanical feeder capable of transporting the material from the bed drain pipe outlet to a location external of the furnace for recycling or disposal.

As combustion occurs within the bed at temperatures in the range of about 760° C. to about 925° C., the particulate material draining from the bed through the bed drain pipes is very hot and, unless cooled, may damage the mechanical equipment used to transport it from the bed drain pipe outlet. Therefore, unless more expensive water-cooled conveying equipment is utilized, frequent maintenance and replacement of the conveying equipment are required.

Due to this fact, it has been customary in the industry to attempt to cool the particulate bed drain material somewhat prior to admitting the bed drain material to the conventional transport equipment disposed beneath the bed. One manner in which to cool the particulate material is to pass a stream of cooling gas, most commonly air, upwardly through the bed drain pipes in counterflow and in direct contact with the particulate material draining through the pipe. The pressure of the cooling gas is controlled such that the velocity of the cooling gas passing upwardly through the drain pipe does not hinder the fall of bed drain material through the pipe. In this manner, heat is transferred directly from the particulate material to the cooling gas flowing upwardly through the bed drain pipe. An alternative method for cooling the bed drain material involves passing the bed drain material over a heat exchange coil disposed within the bed drain pipe. A cooling fluid, typically water, is passed through the heat exchange coils in indirect heat exchange relationship with the hot particulate solids flowing over the external surface of the heating coil. A fluidized bed unit incorporating a bed drain conduit wherein the particulate solids are cooled by direct contact with an upwardly flowing cooling gas and also by indirect contact with a cooling fluid flowing through a heat exchange coil disposed in the bed drain conduit is shown in U.S. Pat. No. 4,227,488.

Cooling systems of this type, however, have disadvantages. One disadvantage is that the presence of a heat exchange coil within the bed drain conduit can result in the hindering of the flow of bed drain material through the conduit and result in pluggage of the bed drain conduit. The use of an upwardly flowing cooling gas in direct contact with the downwardly passing bed drain material will necessarily slow the rate at which bed drain material can be removed from the bed and also result in the entrainment of some small particle bed drain material in the cooling gas. The presence of this particulate material in the cooling gas limits the uses which can be made of the cooling gas and, therefore, the cooling gas must generally be admitted to the fluidized bed chamber so that any particulate solids therein will not be vented to the atmosphere.

It is an object of the present invention to provide a simplified apparatus for cooling hot particulate solids drained from a fluidized bed combustor.

SUMMARY OF THE INVENTION

A fluidized bed reactor of the type having a housing defining therein a chamber divided by a bed support plate into a fluidizing zone thereabove and an air plenum therebeneath, means for supplying particulate material including fuel into the fluidizing zone, and means for supplying air into the air plenum to pass through the bed support plate into the fluidizing zone to fluidize the particulate material to establish a bed of fluidized particulate material therein superadjacent the bed support plate, is provided with a solids cooling apparatus which is particularly adapted to efficiently cool the bed drain material passing therethrough from the bed.

The solids cooling apparatus comprises first conduit means defining a passageway having an inlet communicating with the bed for receiving particulate material and an outlet for discharging particulate material therefrom, a second conduit means disposed coaxially about the first conduit means and defining an annular passage therebetween having an inlet opening at one end thereof and an outlet opening at the other end thereof for conveying a cooling fluid therethrough in indirect heat exchange relationship with particulate material passing through the first conduit means, and a plurality of heat transfer pins each mounted to the first conduit means such that a portion of each pin extends into the passageway for particulate material defined within the first conduit means while another portion of each pin extends into the annular passageway for the cooling fluid defined between the first and second conduit means.

Preferably, the portion of each heat transfer pin which extends into the annular passageway between the first and second conduit means comprises an axially-elongated rod-like member having a plurality of axially spaced fins extending circumferentially outward therefrom within the annular cooling fluid passageway. More preferably, each of the heat transfer pins comprises an axially elongated cylinder-like shell made of a first material having an open end and a closed end, the shell mounted in the first conduit means with its open end opening to the annular cooling fluid passageway and with its closed end extending through the wall of the first conduit means into the central particulate solids passageway, and an axially elongated rod-like element made of a second material having a thermal coefficient of expansion greater than that of the first material, the rod-like element having a first end inserted into the shell in closely spaced relationship therewith to abut the closed end thereof and a second end extending outwardly through the open end of the shell into the annular flow passage for cooling fluid with the second end of the rod-like element having a plurality of axially-spaced fins extending circumferentially outward therefrom within the annular passageway.

BRIEF DESCRIPTION OF THE DRAWING

Other objects, features and advantages of the present invention will be evident from the following description of the preferred embodiment of the solids cooling apparatus of the present invention and the accompanying drawing wherein the solids cooling apparatus is utilized to cool bed drain material removed from a fluidized bed combustor.

DESCRIPTION OF A PREFERRED EMBODIMENT

Figure 1:
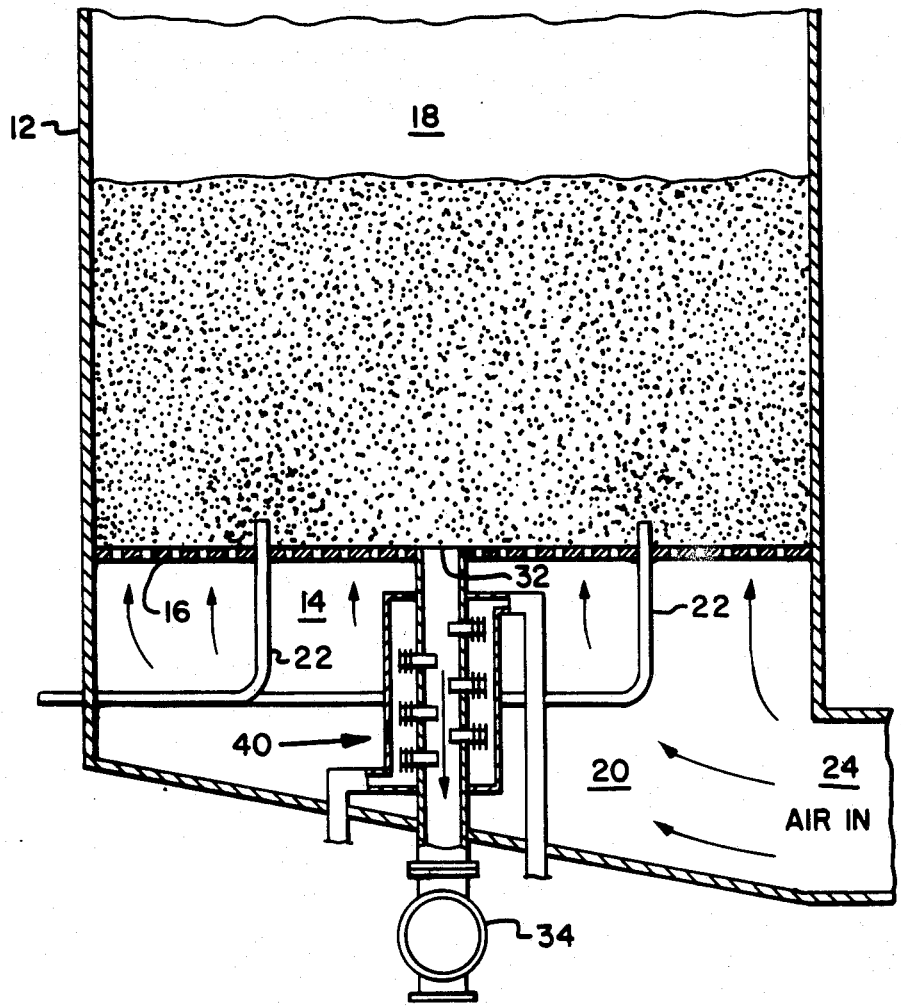
FIG. 1 is an elevational, cross-sectional view showing a fluidized bed combustor incorporating the solids cooling apparatus of the present invention as a bed drain cooler.

Referring now to FIG. 1, there is depicted therein a fluidized bed reactor 10 formed of a housing 12 enclosing a chamber 14 wherein a sulfur-containing fuel, such as particulate coal, is combusted or gasified in a fluidized bed of particulate material which includes a sulfur oxide absorbent, such as limestone or dolomite. A bed support plate 16 extends across the housing 12 to subdivide the chamber 16 enclosed by the housing 2 into a fluidizing zone 18 above the bed support plate 16 and an air plenum 20 beneath the bed support plate 16. Particulate fuel and particulate sulfur absorbent are supplied to the fluidized bed reactor through a plurality of transport lines 22 which extend upwardly into the fluidizing zone 18 through the bed support 16 so as to deposit particulate fuel and particulate sulfur oxide absorbent atop the bed support plate 16. Combustion air is supplied to the air plenum 20 located beneath the bed support plate 16 through inlet means 24. The combustion air passes upwardly from the air plenum 20 into the fluidizing zone 18 through a plurality of air ports in the bed support plate 16 at a rate sufficiently high enough to fluidize the particulate material atop the bed support plate 16 to establish a fluidized bed 30 superadjacent the bed support plate 16. The particulate fuel reacts with the combustion air within the fluidized bed 30 and the freeboard region thereabove to form hot gases which pass out of the fluidized bed combustor 10 to downstream steam generating equipment (not shown).

In order to avoid accumulation of particulate material within the bed as new particulate fuel and unreacted particulate sulfur oxide absorbent are supplied to the bed through feed lines 22, it is necessary to periodically or continuously withdraw a portion of the bed material, including any ash remaining from combustion of the particulate fuel and sulfated absorbent material. To this end, particulate material from the bed passes by gravity through the opening 32 in the bed support plate 16 into and through the bed drain assembly 40 to the rotary valve 34. Upon rotation of the rotary valve 34, the bed drain material accumulating with the bed drain assembly 40 is passed to the bed drain outlet pipe 50 for transfer to a conveying means, such as a mechanical screw conveyor or a pneumatic system for transport for recycle or disposal. As mentioned previously, the solids removed from the fluidized bed through the bed drain assembly 40 are typically at a temperature in the range of about 760° C. to 925° C. and, therefore, must be cooled before being admitted to standard conventional-type conveying equipment. Accordingly, the bed drain assembly 40 shown in FIG. 1 comprises the solid cooling apparatus of the present invention.

Figure 2:
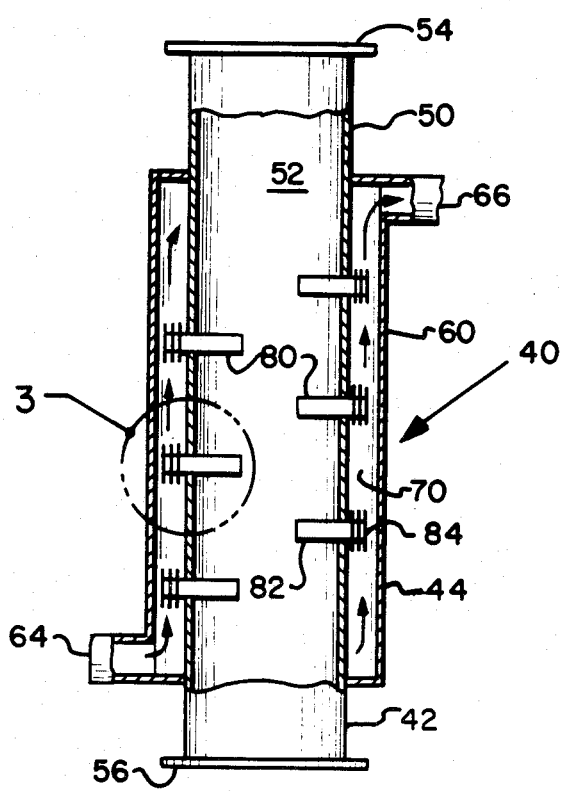
FIG. 2 is a cross-sectional view taken along line 2—2 of FIG. 1 showing the solids cooling apparatus of the present invention.

As best seen in FIG. 2, the solids cooling apparatus of the present invention comprises an axially elongated first conduit means 42, an axially elongated second conduit means 44 disposed coaxially about the first conduit means 42, and a plurality of heat transfer pins 80 mounted in the wall of the first conduit means 42. The first conduit means 42 has a bounding wall 50 made of a corrosion and erosion resistant material such as stainless steel and defining a central passageway 52 through which particulate solids may flow, an inlet 54 at the upper end thereof for receiving the flow of particulate solids to be conveyed through the central passageway 52, and an outlet 56 at the lower end thereof for discharging the flow of particulate solids from the central passageway 52. The second conduit means 44 is disposed coaxially about the first conduit means 42 with its bounding wall 60 disposed in spaced relationship about the bounding wall 50 of the first conduit means 42 thereby defining an annular passageway 70 therebetween. Inlet means 54 is provided in the bounding wall 50 at one end of the second conduit means 44 for receiving a flow of cooling fluid for conveying through the annular passageway 70. Outlet means 66 is provided in the bounding wall 50 of the second conduit means 44 at the other end thereof for discharging the flow of cooling fluid from the annular passageway 70 after the cooling fluid has passed through the annular passageway 70 in indirect heat exchange relationship with the flow of hot particulate solids passing downwardly under the influence of gravity through the central passageway 52 defined within the first conduit means 42.

Heat exchange from the hot solids to the cooling fluid is enhanced in accordance with the present invention by providing a plurality of axially-elongated heat transfer pins 80 which are mounted in the corrosion and erosion resistant bounding wall 50 of the first conduit means 42 at spaced intervals circumferentially about and axially therealong so as to extend through the bounding wall 50 of the first conduit means 42 such that a first portion 82 of each heat transfer pin 80 extends radially inwardly from the bounding wall 50 of the first conduit means 42 into the solids flow passageway 52 and a second portion 84 extends radially outward from the bounding wall 50 of the first conduit means 42 into the annular cooling fluid passageway 70. In operation, heat is conducted from the hot solids flowing through the central flow passage 52 to the first portion 82 of the pins 80 and then axially along the heat transfer pins 80 to the second portion 84 of the pins 80 disposed in the annular cooling fluid passage 70 from which the heat is transferred by convection to the cooling fluid flowing over the second portion 84 of the pins 80 disposed within the annular cooling passage 70. To further enhance heat transfer, it is preferred that the second portion 84 of the pins 80 extending into the annular cooling passage 70 have a plurality of axially-spaced fins 90 extending circumferentially outwardly therefrom within the annular cooling fluid passageway 70. The fins 90 serve to provide extended heat transfer surface and thereby enhance heat transfer from the second portion of the pin 84 to the cooling fluid flowing over the pins 90 which are preferably disposed substantially parallel to the flow of cooling fluid through the annular passageway 70.

Figure 3:
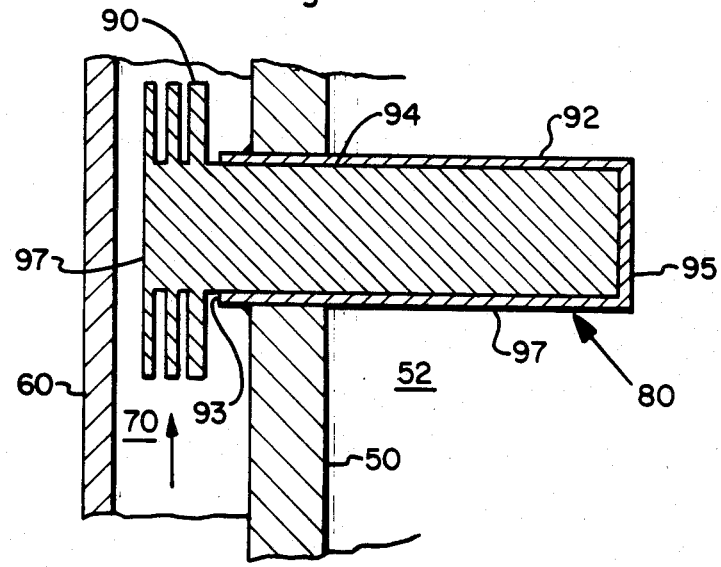
FIG. 3 is a cross-sectional elevational view taken along line 3—3 of FIG. 2 showing a preferred embodiment of the heat transfer pin used in the solids cooling apparatus of the present invention.

In the preferred construction of the heat transfer pins 80 as shown in FIG. 3, the heat transfer pins 80 are comprised of an axially elongated cylinder-like shell 92 and an axially elongated rod-like element 94 adapted for insertion within the cylinder-like shell 92. The axially elongated cylinder-like shell 92 has an open end 93 and a closed end 95 and is made of a first material having high corrosion and erosion resistance. The shell 92 is mounted in the bounding wall 50 of the first conduit means 42 with its open end 93 opening to the annular cooling flow passageway 70. The cylinder-like shell 92 extends therefrom radially inwardly through the bounding wall 50 such that the closed end 95 of the cylinder-like shell 92 is disposed within the central passageway 52. The axially elongated rod-like element 94, which is made of a second material having a high thermal conductivity, has a first end 97 which is inserted into the cylinder-like shell 92 in closely spaced relationship therewith through the open end 93 thereof to abut the closed end 95 thereof, and a second end 99 extending radially outwardly from the open end 93 of the cylinder-like shell 92 into the annular cooling fluid passageway 70. Preferably, the second end 99 of the rod-like element 94 is equipped with a plurality of axially-spaced fins 90 extending circumferentially radially outwardly therefrom within the annular cooling fluid passageway 70.

As mentioned previously, the cylinder-like shell 92 is made of a first material having high corrosion and erosion resistance while the rod-like element 94 is made of a second material having high thermal conductivity. Therefore, the cylinder-like shell 92 will be made of a heat transfer material compatible for welding purposes with that of the bounding wall 50, which would also be made of the same or similar corrosion and erosion resistant material, while the rod-like element 94 may be made of a material which has a high heat conductivity irrespective of its compatibility for welding purposes with the bounding wall 50. Preferably, the cylinder-like shell 92 should be made of a stainless steel material having good strength and high corrosion and erosion properties so as to have a reasonably long life when exposed to the flow of hot particulate solids through the central passageway 52, while the rod-like element 94 is preferably made of a material such as copper having a very high thermal conductivity but poor corrosion and erosion resistance.

The second material of which the element 94 is made desirably also has a thermal coefficient of expansion greater than that of the first material from which the cylinder-like shell 92 is made. Therefore, as the heat transfer pins 80 are exposed to the heat of the hot particulate solids flowing through the central passageway 52, both the cylinder-like shell 92 and the rod-like element 94 become heated and expand. As they are made of dissimilar materials, however, they expand at different rates with the rod-like element 94 inserted within the cylinder-like shell 92 expanding to a greater extent than the cylinder-like shell 92. Thus, the rod-like element 94 will expand circumferentially outward and press firmly against the interior of the cylinder-like shell 92 thereby insuring intimate contact for heat conduction from the cylinder-like shell 92 which is exposed to the hot particulate solids flowing through the central passageway 52 to and along the rod-like element 94 to the cooling fluid passing through the annular passageway 70.

The use of dissimilar metals for these two elements also facilitates manufacture of both the the heat transfer pins 80 and the solids cooling apparatus 40. The heat transfer pins 80 may be manufactured with relatively liberal tolerances on the external diameter of the rod-like element 94 and the internal diameter of the cylinder-like shell 92 as all that need be accomplished during initial manufacturing is that the element 95 fits snuggly within the shell 92. The expansion during heating of the heat transfer pin 80 in operation will insure a firm contact between the element 94 and the shell 92 for efficient heat conduction therealong.

Although the solids cooling apparatus 40 of the present invention has been described and shown herein as serving as a bed drain cooler on a fluidized bed reactor, it is to be understood that the solids cooling apparatus 40 of the present invention may be utilized in other applications where it is desired to cool a stream of solids flowing through a conduit by means of indirect heat transfer with a cooling fluid. Accordingly, it is intended that the present invention be construed and limited in spirit and scope only in a manner consistent with the claims appended hereto.

I claim:

1. A fluidized bed reactor having a housing defining therein a chamber, a bed support plate disposed within the housing and dividing said chamber into a fluidizing zone thereabove and an air plenum therebeneath, means for supplying particulate material including fuel into the fluidizing zone so as to establish a bed of particulate material therein superadjacent the bed support plate, means for supplying air into the air plenum to pass through the bed support plate into the fluidizing zone to fluidize the bed of particulate material, and a bed drain assembly adapted to receive particulate material for removal from the bed, said bed drain assembly comprising:

a. first conduit means having a bounding wall defining a passageway having an inlet communicating with the bed for receiving particulate material and an outlet for discharging particulate material therefrom;
b. second conduit means disposed coaxially about said first conduit means and defining an annular passageway therebetween having an inlet opening at one end thereof and an outlet opening at the other end thereof for conveying a cooling fluid therethrough in indirect heat exchange relationship with the particulate material passing through said first conduit means; and
c. a plurality of heat transfer pins each mounted within the bounding wall of said first conduit means such that a first portion of each of said heat transfer pins extends into the passageway for particulate material defined within said first conduit means and a second portion of each of said heat transfer pins extends into the annular passageway for cooling fluid defined between said first and second conduit means, the first portion of each of said heat transfer pins comprising an axially elongated cylinder-like shell having an open end and a closed end, said shell mounted in said first conduit means with its open end opening to the annular cooling fluid passageway and with its closed end extending into the passageway for particulate material defined within said first conduit means; and the second portion of each of said heat transfer pins comprising an axially elongated rod-like element, said rod-like element having a first end inserted into said cylinder-like shell in closely spaced relationship therewith through the open end thereof to abut the closed end thereof and a second end extending into the annular cooling fluid passageway having a plurality of axially spaced fins extending circumferentially outwardly therefrom within the annular cooling fluid passageway.

2. A fluidized bed reactor as recited in claim 1 wherein the bounding wall of said first conduit means and the first portion of each of said heat transfer pins are comprised of a first material having a relatively high corrosion and erosion resistance, and the second portion of each of said heat transfer pins is comprised of a second material having a relatively high thermal conductivity.

3. A fluidized bed reactor as recited in claim 1 wherein the axially elongated rod-like element portion of each of said heat transfer pins has a thermal coefficient of expansion greater than that of the axially elongated cylinder-like shell portion of each of said heat transfer pins into which the axially elongated rod-like element portion is inserted.

* * * * *